US012581326B2

(12) United States Patent
Veijalainen et al.

(10) Patent No.: US 12,581,326 B2
(45) Date of Patent: Mar. 17, 2026

(54) EVALUATION AND CONTROL OF PREDICTIVE MACHINE LEARNING MODELS IN MOBILE NETWORKS

(71) Applicant: NOKIA TECHNOLOGIES OY, Espoo (FI)

(72) Inventors: Teemu Mikael Veijalainen, Helsinki (FI); Ahmad Awada, Munich (DE); Janne Tapio Ali-Tolppa, Taufkirchen (DE)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 18/026,710

(22) PCT Filed: Sep. 18, 2020

(86) PCT No.: PCT/EP2020/076159
§ 371 (c)(1),
(2) Date: Mar. 16, 2023

(87) PCT Pub. No.: WO2022/058020
PCT Pub. Date: Mar. 24, 2022

(65) Prior Publication Data
US 2023/0345271 A1      Oct. 26, 2023

(51) Int. Cl.
*H04W 24/04* (2009.01)
*H04W 16/18* (2009.01)
*H04W 24/10* (2009.01)

(52) U.S. Cl.
CPC ........... *H04W 24/04* (2013.01); *H04W 16/18* (2013.01); *H04W 24/10* (2013.01)

(58) Field of Classification Search
CPC ..... H04W 24/04; H04W 16/18; H04W 24/10; H04W 24/08
See application file for complete search history.

(56) References Cited

U.S. PATENT DOCUMENTS

2017/0325138 A1     11/2017   Da Silva et al.
2021/0091838 A1*    3/2021    Bai ...................... H04B 7/0639
(Continued)

FOREIGN PATENT DOCUMENTS

WO       2019/172813 A1    9/2019
WO       2020/115273 A1    6/2020

OTHER PUBLICATIONS

International Search Report and Written Opinion dated May 28, 2021 corresponding to International Patent Application No. PCT/EP2020/076159.

(Continued)

*Primary Examiner* — Dhaval V Patel
(74) *Attorney, Agent, or Firm* — Lippes Mathias LLP

(57) ABSTRACT

There are provided measures for evaluation and control of predictive machine learning models in mobile networks. Such measures exemplarily comprise receiving information on a predictive model related to a radio resource management function, obtaining behavior information on an intended behavior of said predicted model, obtaining difference determination information on difference determination with respect to a predictive model prediction and said intended behavior, measuring a network condition, determining a prediction result based on said network condition and said information on said predictive model, determining a behavior result based on said network condition and said behavior information, and evaluating validity of said predictive model based on said prediction result, said behavior result, and said difference determination information.

28 Claims, 13 Drawing Sheets

(56)                    References Cited

U.S. PATENT DOCUMENTS

2021/0337402 A1* 10/2021 Raizer ................... H04W 24/04
2021/0368393 A1* 11/2021 Kotecha ............. H04B 17/3913
2022/0217556 A1*  7/2022 Rydén .................. H04B 17/318

OTHER PUBLICATIONS

Notice of Allowance received for corresponding European Patent
Application No. 20775848.3, dated Mar. 27, 2024, 8 pages.

* cited by examiner

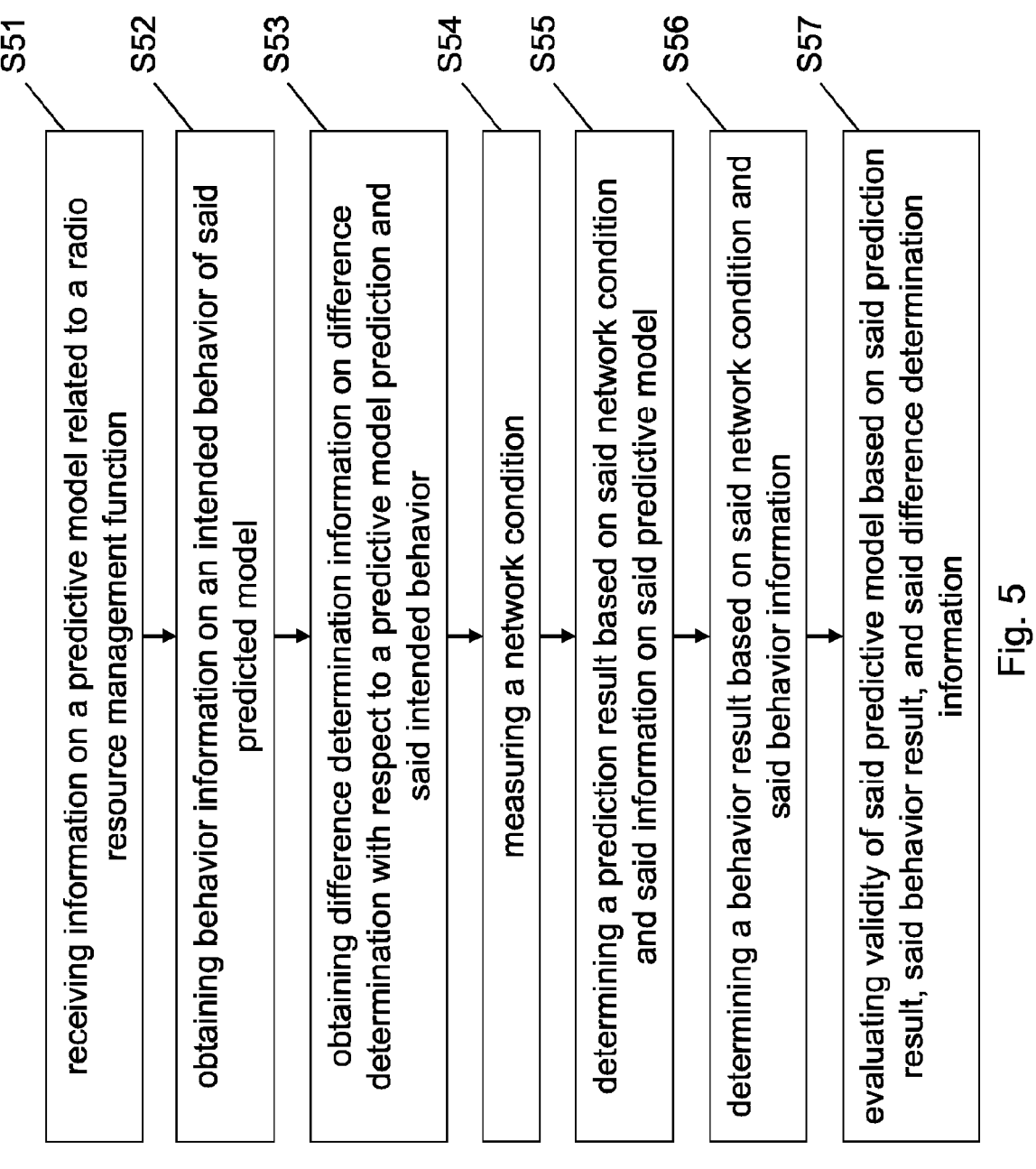

S51 receiving information on a predictive model related to a radio resource management function S52 obtaining behavior information on an intended behavior of said predicted model S53 obtaining difference determination information on difference determination with respect to a predictive model prediction and said intended behavior S54 measuring a network condition S55 determining a prediction result based on said network condition and said information on said predictive model S56 determining a behavior result based on said network condition and said behavior information S57 evaluating validity of said predictive model based on said prediction result, said behavior result, and said difference determination information

Fig. 5

S61 maintaining a predictive model related to a radio resource management function

S62 transmitting, towards a mobile terminal, information on said predictive model

S63 transmitting, towards said mobile terminal, difference threshold information indicative of a difference threshold for evaluation of validity of said predictive model $$3a.\, X_i^1 \qquad 3b.\, f\left(X_i^1 | w\right) = \widetilde{Y}_i$$

$$3c.\, X_i^2 \qquad 3d.\, R\left(X_i^2\right) = Y_i$$

$$3e.\, L_i = \left(RSRP_{\widetilde{Y_{i+1}}} - RSRP_{Y_{i+1}}\right)^2$$

EVALUATION AND CONTROL OF PREDICTIVE MACHINE LEARNING MODELS IN MOBILE NETWORKS

FIELD

Various example embodiments relate to evaluation and control of predictive machine learning models in mobile networks. More specifically, various example embodiments exemplarily relate to measures (including methods, apparatuses and computer program products) for realizing evaluation and control of predictive machine learning models in mobile networks.

BACKGROUND

The present specification generally relates to machine learning (ML) models and the application thereof in mobile networks.

Here, predictive control basically provides advantages over reactive control in particular in terms of speed and the avoidance of (negative) effects reactive control responds to.

As an example, a predictive handover model predicts the target cell for handover based on reference signal received power (RSRP) measurements.

The model (ML model) is trained based on logged measurements X and Y.

FIG. 7 is a schematic diagram illustrating predictive handover training.

As illustrated in FIG. 7, the model is trained by feeding the following:

Input $X_i$=M×N RSRP matrix: M measurements from N specific cells, sampled with frequency $f_s$, Label $Y_i$: cell to handover (calculated based on a labelling function from another N×L measurements after the input sequence).

The labelling function defines what the ML model is trying to learn. This depends totally on the use case and specific implementation. For instance, labels can be calculated to follow the strongest average RSRP after the input sequence, with added penalty from ping-pongs, radio link failure (RLF), etc., and other unwanted events.

The ML model learns a function with parameters w (neural network weights), mapping the input and outputs: f(X|w)=Y.

FIG. 8 is a schematic diagram illustrating predictive handover inference.

As illustrated in FIG. 8, an inference/prediction related to the ML model (e.g. inference/prediction related to handover) is done by feeding UE measurements to the learned model (the same M×N RSRP matrix): $f_{ue}(X_i|w)=\check{Y}$.

The machine learning may also take place at a mobile terminal.

Heretofore, the model is to be downloaded to the mobile terminal (e.g. user equipment (UE)).

In particular, the network may train a base model for mobility based on logged RSRP measurements.

Subsequently, the network may download the ML model to UEs (valid e.g. on certain area or cells).

FIG. 9 is a schematic diagram illustrating signaling between mobile terminals and the network and in particular shows handover related and model download related signaling. More specifically, FIG. 9 shows the download of an ML model from the network towards a UE in line with the present example.

As is illustrated in FIG. 9, an ML model related to a cell 1 is downloaded to the UE when present in cell 1 (served by cell 1). If the UE changes (mobility) to a cell 2 (a handover preparation is illustrated in FIG. 9), an ML model related to the cell 2 is downloaded to the UE when present in cell 2 (served by cell 2).

The respective model may be re-trained based on UE-feedback or UEs can retrain/improve the model itself based on its experience and upload the updated model back to network where the (central) model may be refined based on the experience from several UEs (this can be achieved with federated learning).

However, When an ML model is taken into use, there is no guarantee that the model is working properly. For instance, it might be that re-training has corrupted the model, or the model does not have experience from certain situations in the network. These circumstances would result in poor network performance.

Hence, the problem arises that invalid ML model performance is to be detected and this invalid ML model performance is to be resolved in order to detect and fix above-outlined or similar circumstances.

Hence, there is a need to provide for evaluation and control of predictive machine learning models in mobile networks.

SUMMARY

Various example embodiments aim at addressing at least part of the above issues and/or problems and drawbacks.

Various aspects of example embodiments are set out in the appended claims.

According to an example aspect, there is provided a method of a mobile terminal, the method comprising receiving information on a predictive model related to a radio resource management function, obtaining behavior information on an intended behavior of said predicted model, obtaining difference determination information on difference determination with respect to a predictive model prediction and said intended behavior, measuring a network condition, determining a prediction result based on said network condition and said information on said predictive model, determining a behavior result based on said network condition and said behavior information, and evaluating validity of said predictive model based on said prediction result, said behavior result, and said difference determination information.

According to an example aspect, there is provided a method of a network node, the method comprising maintaining a predictive model related to a radio resource management function, transmitting, towards a mobile terminal, information on said predictive model, and transmitting, towards said mobile terminal, difference threshold information indicative of a difference threshold for evaluation of validity of said predictive model.

According to an example aspect, there is provided an apparatus of a mobile terminal, the apparatus comprising receiving circuitry configured to receive information on a predictive model related to a radio resource management function, obtaining circuitry configured to obtain behavior information on an intended behavior of said predicted model, and to obtain difference determination information on difference determination with respect to a predictive model prediction and said intended behavior, measuring circuitry configured to measure a network condition, determining circuitry configured to determine a prediction result based on said network condition and said information on said predictive model, and to determine a behavior result based on said network condition and said behavior information, and evaluating circuitry configured to evaluate validity of said predictive model based on said prediction result, said behavior result, and said difference determination information.

According to an example aspect, there is provided an apparatus of a network node, the apparatus comprising maintaining circuitry configured to maintain a predictive model related to a radio resource management function, transmitting circuitry configured to transmit, towards a mobile terminal, information on said predictive model, and to transmit, towards said mobile terminal, difference threshold information indicative of a difference threshold for evaluation of validity of said predictive model.

According to an example aspect, there is provided an apparatus of a mobile terminal, the apparatus comprising at least one processor, at least one memory including computer program code, and at least one interface configured for communication with at least another apparatus, the at least one processor, with the at least one memory and the computer program code, being configured to cause the apparatus to perform receiving information on a predictive model related to a radio resource management function, obtaining behavior information on an intended behavior of said predicted model, obtaining difference determination information on difference determination with respect to a predictive model prediction and said intended behavior, measuring a network condition, determining a prediction result based on said network condition and said information on said predictive model, determining a behavior result based on said network condition and said behavior information, and evaluating validity of said predictive model based on said prediction result, said behavior result, and said difference determination information.

According to an example aspect, there is provided an apparatus of a network node, the apparatus comprising at least one processor, at least one memory including computer program code, and at least one interface configured for communication with at least another apparatus, the at least one processor, with the at least one memory and the computer program code, being configured to cause the apparatus to perform maintaining a predictive model related to a radio resource management function, transmitting, towards a mobile terminal, information on said predictive model, and transmitting, towards said mobile terminal, difference threshold information indicative of a difference threshold for evaluation of validity of said predictive model.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient evaluation of validity of predictive machine learning models and response thereto to thereby solve at least part of the problems and drawbacks identified in relation to the prior art.

By way of example embodiments, there is provided evaluation and control of predictive machine learning models in mobile networks. More specifically, by way of example embodiments, there are provided measures and mechanisms for realizing evaluation and control of predictive machine learning models in mobile networks.

Thus, improvement is achieved by methods, apparatuses and computer program products enabling/realizing evaluation and control of predictive machine learning models in mobile networks.

BRIEF DESCRIPTION OF THE DRAWINGS

In the following, the present disclosure will be described in greater detail by way of non-limiting examples with reference to the accompanying drawings, in which FIG. 5 is a schematic diagram of a procedure according to example embodiments.

DETAILED DESCRIPTION

Figure 1:
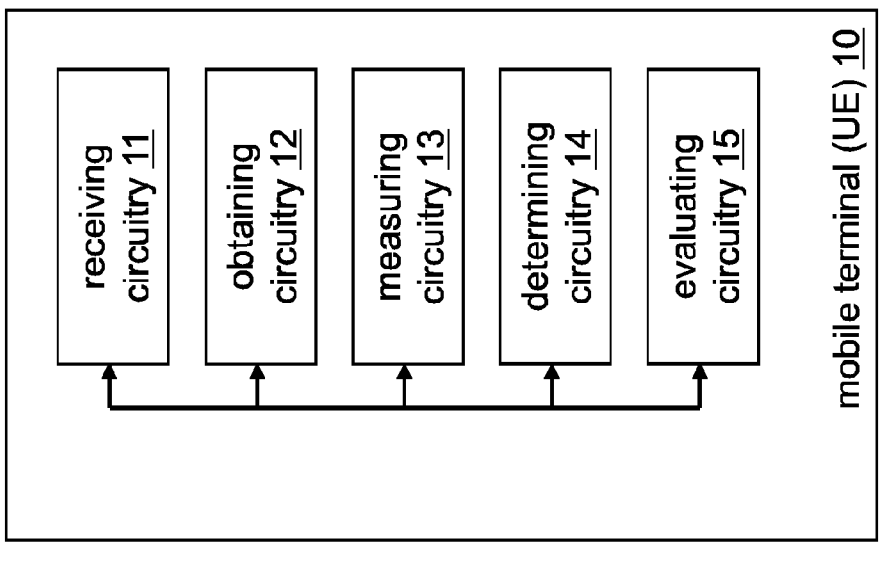
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) evaluation and control of predictive machine learning models in mobile networks.

While example embodiments are described in the context of predictive handover or channel prediction, the principle according to the present disclosure is not limited thereto.

As a first step towards a solution for addressing the above-discussed problems and disadvantages, for logging measurements/ML-training data, it might be considered to collect data with minimization of drive tests (MDT). This means that a UE collects the measurements all the time, or logging is triggered by measurement thresholds. The threshold could be configured to log on cell edges. However, the ML might work on some handover regions, while it does not work on another region. Moreover, the model may be invalid even in cell center area, from which the thresholds would not trigger data collection.

As a further step towards a solution for addressing the above-discussed problems and disadvantages, utilization of successful handover reports might be considered. These consider only radio measurements. Further, it is foreseen that the mobility robustness optimization (MRO) function in New Radio (NR) could be enhanced to provide a more robust mobility via reporting failure events observed during successful handovers. One approach is to configure the UE to compile a report associated to a successful handover comprising a set of measurements collected during the handover phase, i.e. measurement at the handover trigger, measurement at the end of handover execution or measurement after handover execution. The UE could be configured with triggering conditions to compile the successful handover report, hence the report would be triggered only if the conditions are met. This limits the UE reporting to relevant cases, such as underlying issues detected by radio link monitoring (RLM), or bidirectional forwarding detection (BFD) detected upon a successful handover event.

For the explanation of example embodiments, it is assumes that a UE is configured with a ML model to run a certain radio resource management (RRM) function. While example embodiments are described in the context of predictive mobility as an example, the principle according to the present disclosure is not limited thereto.

In principle, according to example embodiments, the network configures UE ML with additional labelling and loss functions. The UE according to the example embodiments runs inference with the ML model and uses the labelling function to determine the true outcome of each inference sample. The prediction and true outcome are then compared using the loss function to determine validity of the model. If the loss is higher than a threshold, according to the example embodiments, a loss-based measurement event is triggered, which can lead to measurement-logging, to UE feedback in connected state, and/or to a fallback to another mobility configuration.

In this way, according to example embodiments, the network gains knowledge as to whether the ML model is working, and which measurements contributed to high loss. This information can be used to decide activation or de-configuration of the model, and to pinpoint which measurements contributed to high loss, which can then be used to re-train the model.

Thus, example embodiments enable to validate ML performance to decide activation of the model or fallback to another method. Further, example embodiments enable that training data can be collected from areas where the ML is not working properly. This leads to faster and more efficient training of the ML. In terms of network performance, this means less signaling overhead and better mobility performance, since the problematic areas for ML can be detected and refined.

FIG. 1 is a block diagram illustrating an apparatus according to example embodiments. The apparatus may be a mobile terminal 10 such as a UE comprising a receiving circuitry 11, an obtaining circuitry 12, a measuring circuitry 13, a determining circuitry 14, and an evaluating circuitry 15. The receiving circuitry 11 receives information on a predictive model related to a radio resource management function. The obtaining circuitry 12 obtains behavior information on an intended behavior of said predicted model. The obtaining circuitry 12 further obtains difference determination information on difference determination with respect to a predictive model prediction and said intended behavior. The measuring circuitry 13 measures a network condition. The determining circuitry 14 determines a prediction result based on said network condition and said information on said predictive model. The determining circuitry 14 further determines a behavior result based on said network condition and said behavior information. The evaluating circuitry 15 evaluates validity of said predictive model based on said prediction result, said behavior result, and said difference determination information. FIG. 5 is a schematic diagram of a procedure according to example embodiments. The apparatus according to FIG. 1 may perform the method of FIG. 5 but is not limited to this method. The method of FIG. 5 may be performed by the apparatus of FIG. 1 but is not limited to being performed by this apparatus. As shown in FIG. 5, a procedure according to example embodiments comprises an operation of receiving (S51) information on a predictive model [e.g. an ML model] related to a radio resource management function, an operation of obtaining (S52) behavior information [e.g. a labelling function] on an intended behavior of said predicted model, an operation of obtaining (S53) difference determination information [e.g. a loss function] on difference determination with respect to a predictive model prediction and said intended behavior, an operation of measuring (S54) a network condition, an operation of determining (S55) a prediction result based on said network condition and said information on said predictive model, an operation of determining (S56) a behavior result based on said network condition and said behavior information, and an operation of evaluating (S57) validity of said predictive model based on said prediction result, said behavior result, and said difference determination information.

Figure 2:
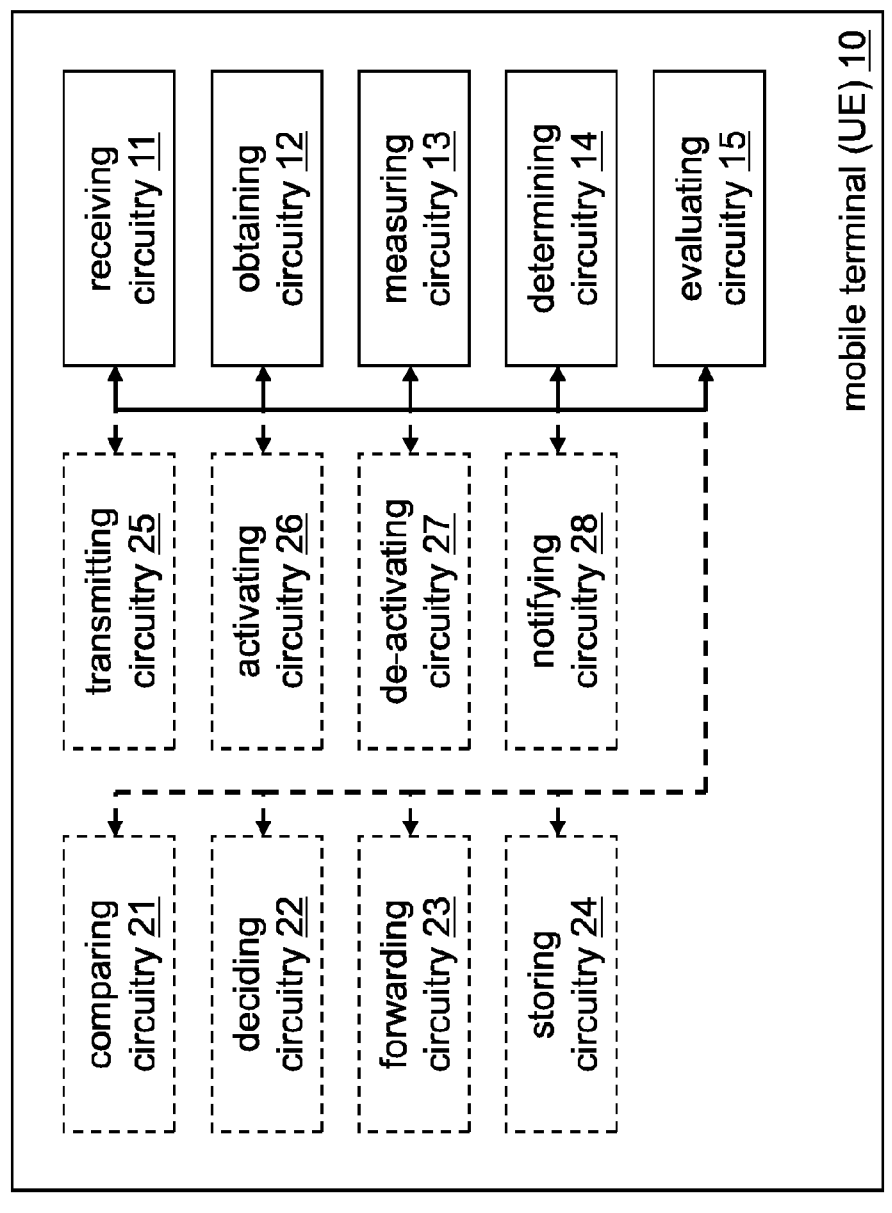
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a comparing circuitry 21, a deciding circuitry 22, a forwarding circuitry 23, a storing circuitry 24, a transmitting circuitry 25, an activating circuitry 26, a de-activating circuitry 27, and/or a notifying circuitry 28.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, exemplary additional operations and exemplary details of the evaluating operation (S57) are given, which are inherently independent from each other as such. According to such variation, an exemplary method according to example embodiments may comprise an operation of receiving difference threshold information indicative of a difference threshold. Further, such exemplary evaluating operation (S57) according to example embodiments may comprise an operation of determining a value indicative of a difference between said prediction result and said behavior result based on said difference determination information, and an operation of comparing said value indicative of said difference with said difference threshold.

According to further example embodiments, said value indicative of said difference is determined as an average value of a plurality of differences between said prediction result and said behavior result respectively determined within a predetermined period of time.

According to a variation of the procedure shown in FIG. 5, exemplary details of the evaluating operation (S57) are given, which are inherently independent from each other as such. Such exemplary evaluating operation (S57) according to example embodiments may comprise an operation of deciding reduced validity of said predictive model, if said value indicative of said difference exceeds said difference threshold.

According to a variation of the procedure shown in FIG. 5, exemplary additional operations are given, which are inherently independent from each other as such. According to such variation, an exemplary method according to example embodiments may comprise an operation of forwarding said measured network condition and/or said prediction result and/or said behavior result and/or said value indicative of said difference towards a network node in response to said deciding said reduced validity of said predictive model.

According to a variation of the procedure shown in FIG. 5, exemplary additional operations are given, which are inherently independent from each other as such. According to such variation, an exemplary method according to example embodiments may comprise an operation of storing said measured network condition and/or said prediction result and/or said behavior result and/or said value indicative of said difference in response to said deciding said reduced validity, and an operation of transmitting said stored measured network condition and/or prediction result and/or behavior result and/or value indicative of said difference towards a network node in response to a predetermined event.

According to a variation of the procedure shown in FIG. 5, exemplary additional operations are given, which are inherently independent from each other as such. According to such variation, an exemplary method according to example embodiments may comprise an operation of activating utilization of an alternative control processing with respect to said radio resource management function based on said deciding said reduced validity of said predictive model.

According to a variation of the procedure shown in FIG. 5, exemplary additional operations are given, which are inherently independent from each other as such. According to such variation, an exemplary method according to example embodiments may comprise an operation of deactivating utilization of said predictive model based on said deciding said reduced validity of said predictive model.

According to a variation of the procedure shown in FIG. 5, exemplary additional operations are given, which are inherently independent from each other as such. According to such variation, an exemplary method according to example embodiments may comprise an operation of receiving an instruction regarding control processing with respect to said radio resource management function.

According to a variation of the procedure shown in FIG. 5, exemplary additional operations are given, which are inherently independent from each other as such. According to such variation, an exemplary method according to example embodiments may comprise an operation of receiving information on actions to be triggered upon reduced validity of said predictive model.

According to a variation of the procedure shown in FIG. 5, exemplary additional operations are given, which are inherently independent from each other as such. According to such variation, an exemplary method according to example embodiments may comprise an operation of notifying capability for determination of a behavior according to said behavior information. Alternatively, or in addition, according to such variation, an exemplary method according to example embodiments may comprise an operation of notifying capability for determination of a difference according to said difference determination information.

According to a variation of the procedure shown in FIG. 5, exemplary additional operations are given, which are inherently independent from each other as such. According to such variation, an exemplary method according to example embodiments may comprise an operation of notifying capability for evaluation of validity with respect to said radio resource management function.

According to a variation of the procedure shown in FIG. 5, exemplary additional operations are given, which are inherently independent from each other as such. According to such variation, an exemplary method according to example embodiments may comprise an operation of receiving said behavior information, and an operation of receiving said difference determination information.

According to further example embodiments, said predictive model is a predictive mobile terminal handover model.

Alternatively, or in addition, according to further example embodiments, said network condition is a reference signal received power.

Figure 3:
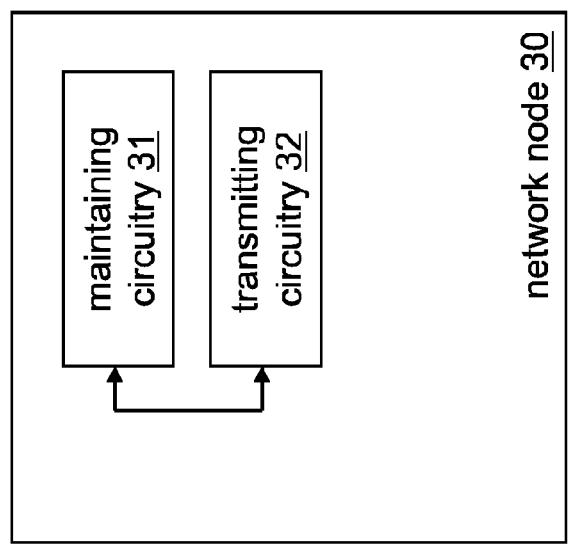
FIG. 3 is a block diagram illustrating an apparatus according to example embodiments.
Figure 6:
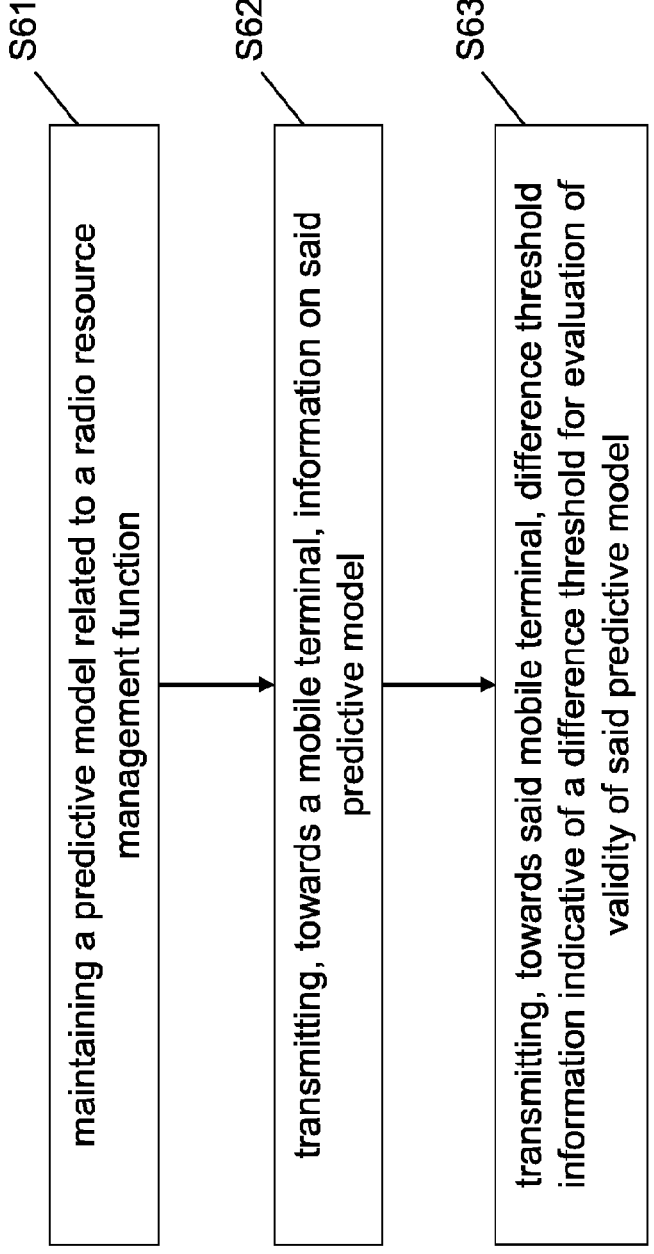
FIG. 6 is a schematic diagram of a procedure according to example embodiments.

FIG. 3 is a block diagram illustrating an apparatus according to example embodiments. The apparatus may be a network node 30 such as a base station or a network control entity comprising a maintaining circuitry 31 and a transmitting circuitry 32. The maintaining circuitry 31 maintains a predictive model related to a radio resource management function. The transmitting circuitry 32 transmits, towards a mobile terminal, information on said predictive model. The transmitting circuitry 32 further transmits, towards said mobile terminal, difference threshold information indicative of a difference threshold for evaluation of validity of said predictive model. FIG. 6 is a schematic diagram of a procedure according to example embodiments. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to example embodiments comprises an operation of maintaining (S61) a predictive model [e.g. an ML model] related to a radio resource management function, an operation of transmitting (S62), towards a mobile terminal, information on said predictive model, and an operation of transmitting (S63), towards said mobile terminal, difference threshold information indicative of a difference threshold for evaluation of validity of said predictive model.

Figure 4:
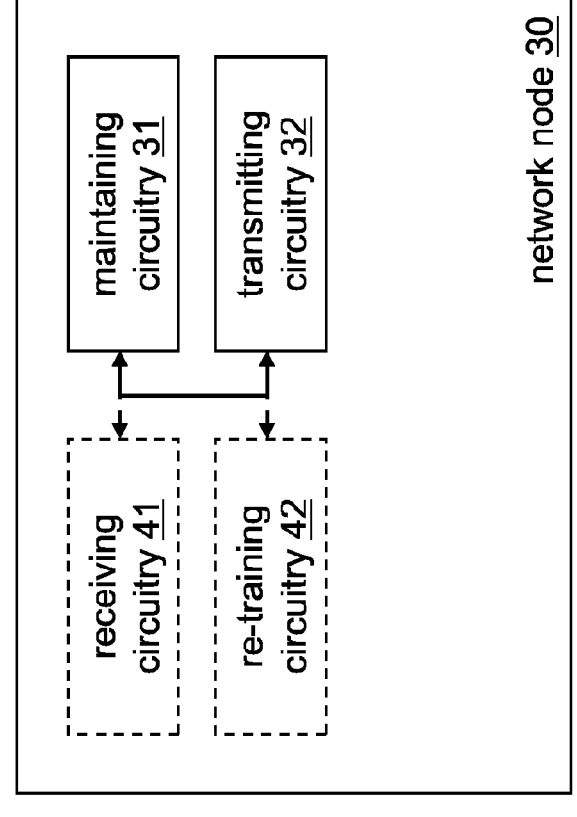
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a receiving circuitry 41 and/or a re-training circuitry 42.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 6, exemplary additional operations are given, which are inherently independent from each other as such. According to such variation, an exemplary method according to example embodiments may comprise an operation of receiving a notification of capability of said mobile terminal for determination of a behavior according to said behavior information. Alternatively, or in addition, according to such variation, an exemplary method according to example embodiments may comprise an operation of receiving a notification of capability of said mobile terminal for determination of a difference according to said difference determination information.

According to a variation of the procedure shown in FIG. 6, exemplary additional operations are given, which are inherently independent from each other as such. According to such variation, an exemplary method according to example embodiments may comprise an operation of receiving a notification of capability of said mobile terminal for evaluation of validity with respect to said radio resource management function.

According to a variation of the procedure shown in FIG. 6, exemplary additional operations are given, which are inherently independent from each other as such. According to such variation, an exemplary method according to example embodiments may comprise an operation of transmitting, towards said mobile terminal, behavior information [e.g. a labelling function] on an intended behavior of said predicted model, and an operation of transmitting, towards said mobile terminal, difference determination information [e.g. a loss function] on difference determination with respect to a predictive model prediction and said intended behavior.

According to a variation of the procedure shown in FIG. 6, exemplary additional operations are given, which are inherently independent from each other as such. According to such variation, an exemplary method according to example embodiments may comprise an operation of receiving, from said mobile terminal, a measured network condition and/or a prediction result determined based on said network condition and said information on said predictive model and/or a behavior result determined based on said network condition and said behavior information and/or a value indicative of a difference between said prediction result and said behavior result determined based on said difference determination information.

According to a variation of the procedure shown in FIG. 6, exemplary additional operations are given, which are inherently independent from each other as such. According to such variation, an exemplary method according to example embodiments may comprise an operation of transmitting an instruction to activate utilization of an alternative control processing with respect to said radio resource management function based on said measured network condition and/or prediction result and/or behavior result and/or value indicative of said difference.

According to a variation of the procedure shown in FIG. 6, exemplary additional operations are given, which are inherently independent from each other as such. According to such variation, an exemplary method according to example embodiments may comprise an operation of transmitting an instruction to de-activate utilization of said predictive model based on said measured network condition and/or prediction result and/or behavior result and/or value indicative of said difference.

According to a variation of the procedure shown in FIG. 6, exemplary additional operations are given, which are inherently independent from each other as such. According to such variation, an exemplary method according to example embodiments may comprise an operation of re-training said predictive model based on said measured network condition and/or prediction result and/or behavior result and/or value indicative of said difference.

According to a variation of the procedure shown in FIG. 6, exemplary additional operations are given, which are inherently independent from each other as such. According to such variation, an exemplary method according to example embodiments may comprise an operation of transmitting, towards said mobile terminal, information on said re-trained predictive model.

According to a variation of the procedure shown in FIG. 6, exemplary additional operations are given, which are inherently independent from each other as such. According to such variation, an exemplary method according to example embodiments may comprise an operation of transmitting, towards said mobile terminal, information on actions to be triggered upon decided reduced validity of said predictive model.

According to further example embodiments, said predictive model is a predictive mobile terminal handover model.

Alternatively, or in addition, according to further example embodiments, said network condition is a reference signal received power.

In more specific terms, according to example embodiments, the following processing is implemented as a whole or in part.

Here, the following terminology and symbols are used:

1) The ML model is described as a function $(X_i^1|w)=\tilde{Y}_i$, where neural network weights are w, input of the model at time i is $X_i^1$, and prediction of the model at time i is $\tilde{Y}_i$.

2) The labelling function is described as a function $R(X_i^2)=Y_i$, where $X_i^2$ is the input for the labelling, and $Y_i$ is the outcome of the labelling.

3) The loss function is described as a function $L(Y_i, \tilde{Y}_i)=L_i$, where $L_i$ is the loss between the prediction and label at time i.

1. The UE is provided with ML model $(f(X_i|w)=\tilde{Y}_i)$ responsible of an RRM function.

2. The UE is provided with a loss-based measurement event configuration:

a. loss and labeling functions which are associated with the ML model, b. a loss threshold for triggering the event, c. an action to be triggered in response to the event (step 4 below).

3. The UE calculates a loss according to the configuration (as e.g. outlined in the example in FIG. 10):

a. The UE collects an input sample for the ML model $X_t^1$, b. The UE predicts at time t with the input from step (3a) $f(X_t^1|w)=\tilde{Y}_i$, c. The UE collects an input $X_t^2$ for the labelling function, d. The UE calculates a label/outcome $Y_t$ using $X_t^2$, e. The UE computes a loss $L_i$.

4. If the loss is higher than given threshold, a loss-based measurement event is triggered:

a. Feedback measurements including one or more of the measurements in step 3a-e, b. Log one or more of the measurements in step 3a-e and report later to network, c. or UE autonomously fallback to another mobility configuration.

5. In response to the event, the network can do the following:

a. Activate the model, or de-configure the model, in this case fallback to another mobility configuration, b. Use the radio measurements part of the loss-feedback to re-train the ML model.

Example embodiments are explained below in more detail on the basis of the above implementation structure (steps 1 top 5). However, as already mentioned above, example embodiments may implement this structure as a whole or in part.

Step 1:

According to example embodiments, the ML may be a predictive handover model (as described above). Alternatively, the ML may be a channel prediction model (e.g. RSRP prediction, or radio channel prediction). However, the ML is not limited to these examples.

Steps 2 and 3 (i.e. Configuration and Loss Calculation):

According to example embodiments, the UE is provided with a threshold that determines triggering of the loss-based measurement event. The threshold may be for a single loss value or may be based on an average loss over multiple samples.

Further, according to example embodiments, the main use case may be that loss validation is run in the background (i.e. without any effect on the actual control) before using the ML model. This is in particular suitable for use cases when the required data (for ML input and labelling) is available in these states, such as RSRP measurements for predictive handover. In this way, the model can be validated before actually using the model (i.e. before the ML model has any effect on the actual control), or training data can be collected to refine model in invalid areas. Besides this, example embodiments can also be applied with idle/inactive users.

According to example embodiments, labelling and loss functions may be predefined by standards, meaning that the functions are already implemented in the UE if supported. In such case, according to example embodiments, the UE feedbacks capability for the supported labelling and loss functions. In response thereto, according to example embodiments, the network can activate and associate proper functions for the ML model. For instance, a standard might define mean square loss between the predicted RSRP and observed RSRP as a loss function that can be used with predictive handover.

According to example embodiments, the labelling and loss functions can be up to UE implementation. For instance, a standard might define that the UE should be able to evaluate a channel prediction validity with a certain accuracy. In this case, according to example embodiments, the UE feedbacks capability of validating a certain RRM function. In response thereto, according to example embodiments, the network may associate the UE implemented validity function with a ML model.

According to example embodiments, the loss and validation functions can be approximations of the labelling and loss functions actually used to train the ML, because it might not be feasible to configure some complex labelling logic to UE, or the network (operator) does not want to reveal its labelling logic. For instance, for predictive handover, according to example embodiments, the network can configure the UE to calculate a mean square error (MSE) between RSRP of the predicted cell for handover and of the strongest cell. If handovers are predicted towards weak cells, the loss would indicate that the model is probably not working as it should, and data can be collected from these areas where the model is probably not working as it should. This approximation can be further enhanced e.g. by adding penalty from number of handovers etc. which, according to example embodiments, is then part of the configuration.

Steps 4 and 5 (i.e. Actions in Response to High Loss):

On the one hand, as outlined in the above implementation structure, a loss-based measurement action may be loss-based measurement feedback. In connected mode, the UE can add additional information to a measurement report, e.g. loss, measurements contributed to loss, etc. This way, according to example embodiments, the UE can warn the serving cell that the ML model is not working properly, and can at the same time feedback the measurements that contributed to the high loss. I.e., according to example embodiments, the network gains the knowledge as to whether loss is high, and which measurements contributed to the high loss. In response to this feedback, according to example embodiments, the network can activate or deactivate the ML-model and fallback to another mobility configuration (e.g. typical measurement-event based mobility, or to validated ML-model). Further, according to example embodiments, the network can use the measurements to re-train the model in the high loss areas. The loss-based measurement reporting can continue after the deactivation, parallel to the fallback method. In such case, the network continues to gain knowledge on the high loss situations to re-train the model. At some point, according to example embodiments, the network can then configure the UE with the new model and use the loss-feedback to determine whether the new model should be activated.

According to example embodiments, instead of the network de-configuring the ML model (as above), the ML model and a non-ML method are configured in parallel and the UE can immediately switch from the ML method to the non-ML method if loss is larger than the threshold. As an example, according to example embodiments, the source cell prepares one or more cells for conditional handover (CHO) and provides the UE with the typical thresholds to trigger CHO, in addition to the ML model. If the ML is not predicting HO, while the serving cell's RSRP goes below the strongest cell, this might result in high loss and the UE fallbacks to the standard CHO execution, which will then trigger a handover.

Figure 7:
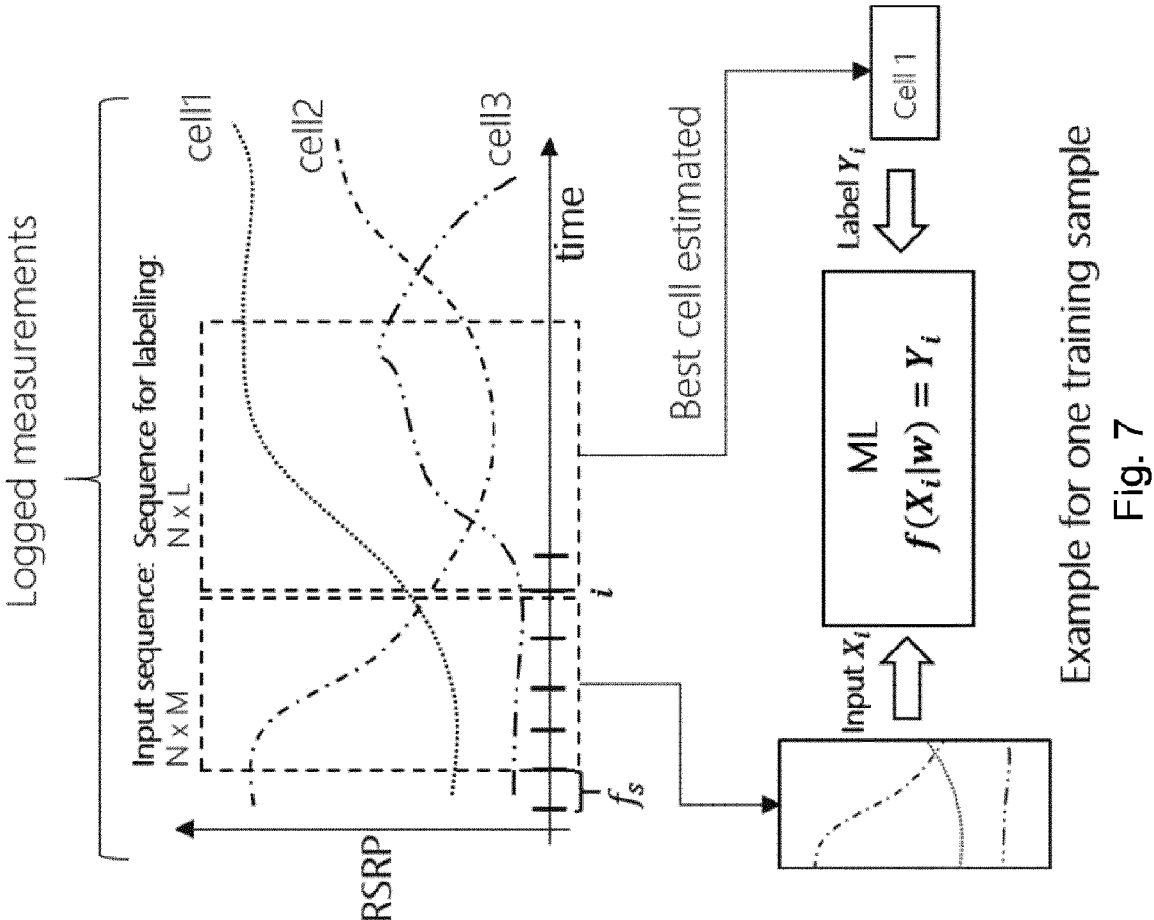
FIG. 7 is a schematic diagram illustrating predictive handover training.
Figure 8:
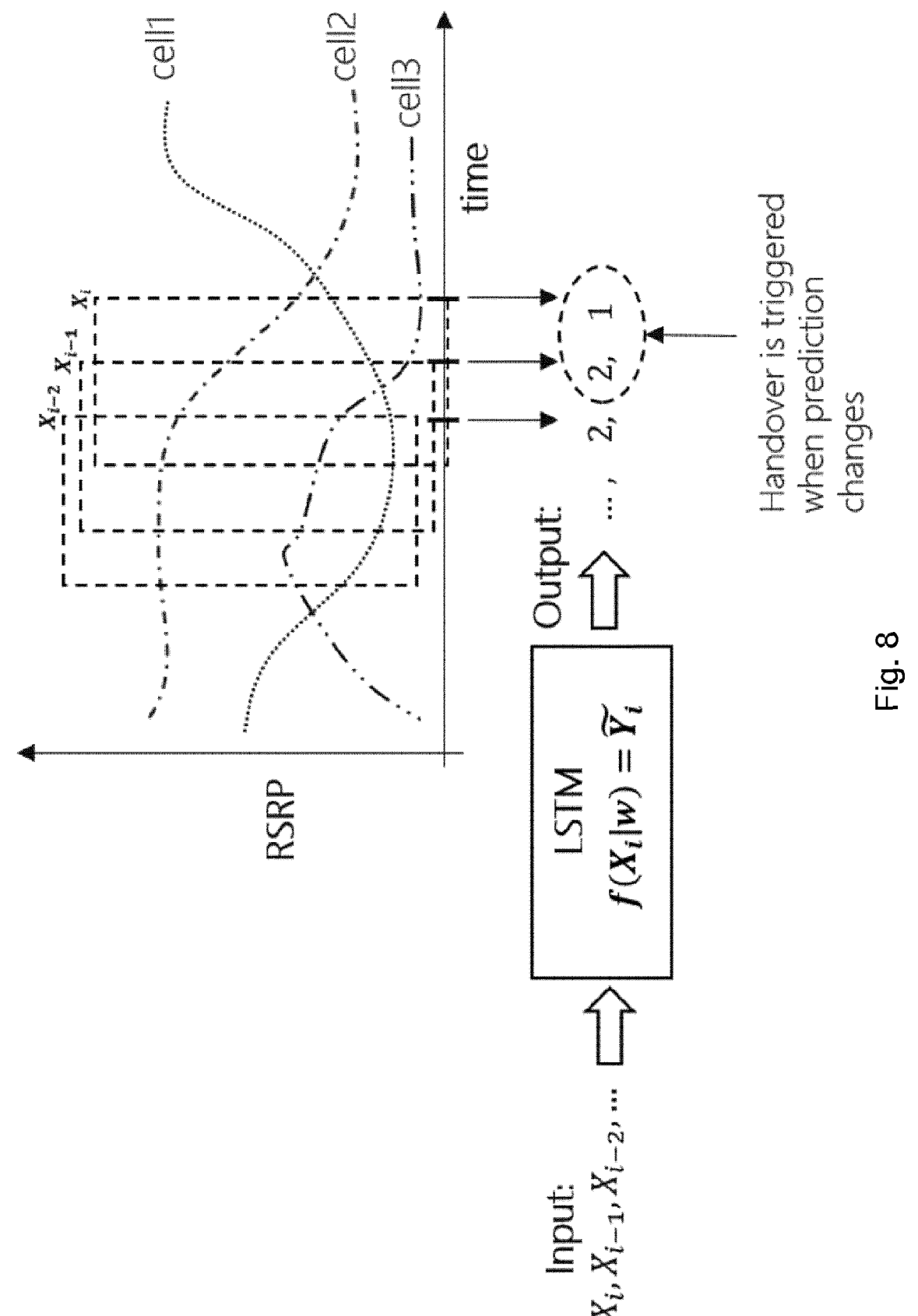
FIG. 8 is a schematic diagram illustrating predictive handover inference.
Figure 9:
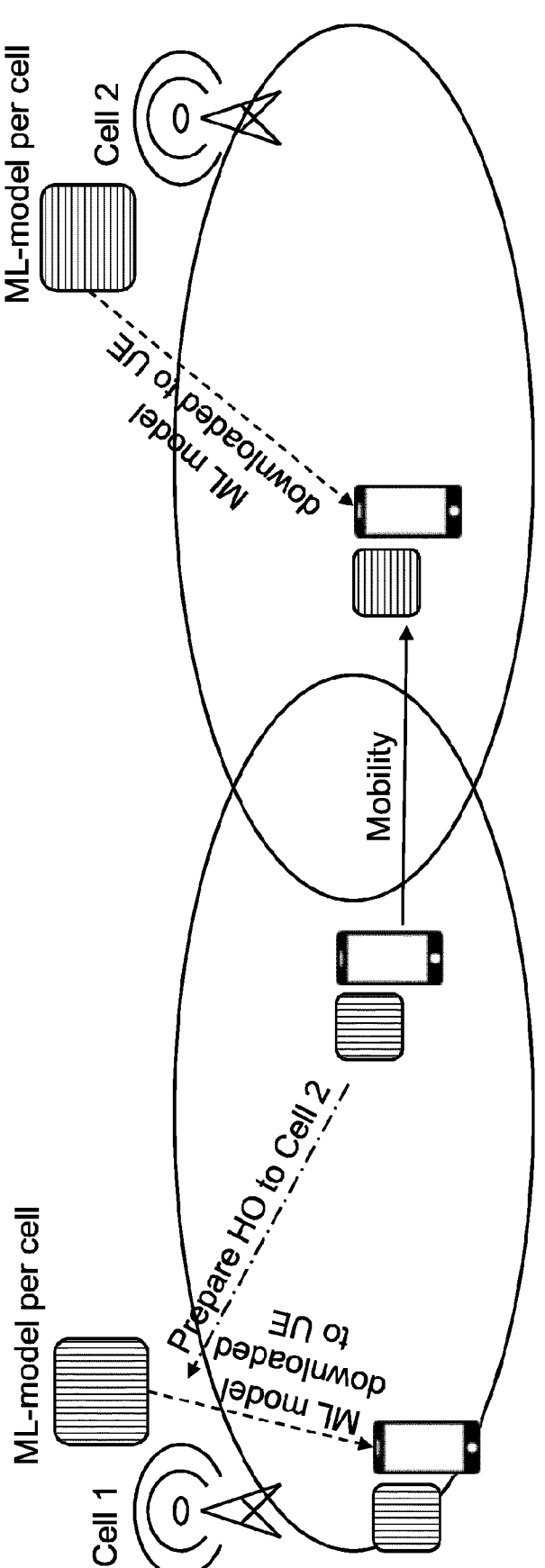
FIG. 9 is a schematic diagram illustrating signaling between mobile terminals and the network and in particular shows handover related and model download related signaling.

On the other hand, as outlined in the above implementation structure, a loss-based measurement action may be loss-based measurement logging. Instead of feedbacking the measurements, according to example embodiments, the UE can be configured to log the measurements. In idle/inactive modes, the loss-based measurement-event triggers the UE to log radio measurements contributed to the high loss, which are reported to network in connection establishment. These measurements can be used to re-train the model (e.g. in line with FIGS. 7 and 8).

According to example embodiments, the loss-based measurement feedback and logging can include one or more of the steps defined in steps 3a-e of the above-outlined implementation structure. As an example, the UE can be configured to report (or log and report) only the loss values, or average loss, for the network to decide whether it is safe to activate the model.

According to example embodiments, the feedback or logging can be configured to continue some time (e.g. K seconds) after the first event even though the following samples are below the threshold. If a new event is triggered before this measurement feedback timer expires, the timer is restarted.

Specific details of the loss calculation according to example embodiments are provided below.

Again, a predictive handover model (as described above) is used as an example for the ML method. However, the ML is not limited to this example.

Figure 10:
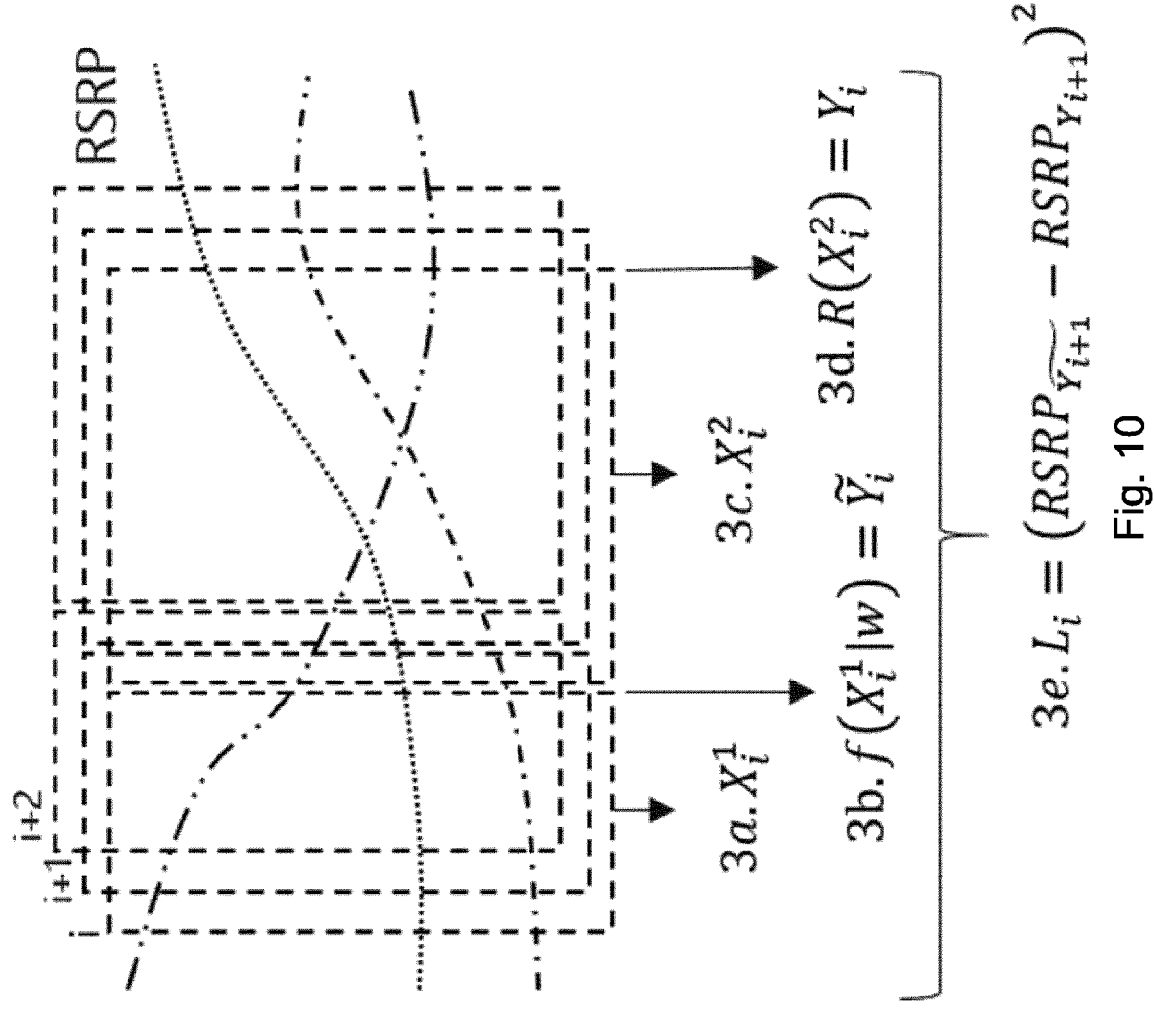
FIG. 10 is a schematic diagram illustrating a processing utilizing a predictive model (preparation, computation) and the evaluation thereof according to example embodiments.

FIG. 10 is a schematic diagram illustrating a processing utilizing a predictive model (preparation, computation) and the evaluation thereof according to example embodiments. In particular, FIG. 10 illustrates an example on computing the steps at the UE for predictive handover.

FIG. 10 demonstrates the steps for loss calculation. First, network configures UE with the predictive handover model (step 1 of the above-outlined implementation structure). The model is then associated with approximation of the labelling function and loss function. In step 3a of the above-outlined implementation structure, an input sample is taken. A Cell ID that is selected as label is the cell with highest average RSRP over a time period T, after the prediction at time i (step 3b of the above-outlined implementation structure). In steps 3c and 3d of the above-outlined implementation structure, an input for the labelling function is taken, and the label/ outcome is calculated. Loss is computed, in next time step (i+1) after the prediction, by (according to example embodiments) the mean square error of RSRP of the predicted cell and RSRP of the labelled cell $L_i = (\text{RSR} P_{\widehat{Y_{i+1}}} - \text{RSRP}_{Y_{i+1}})^2$ (step 3e of the above-outlined implementation structure). This is repeated over N steps to determine the average loss $$L = \frac{1}{N} \sum_{k=1...N} L_k^2,$$

which is then compared with a given threshold. If L is higher than the threshold, all the RSRP measurements during this time period are logged or reported (step 4 of the above-outlined implementation structure).

According to example embodiments, the UE continues logging/feedback for some time (K steps) even if the loss drops below the threshold.

Figure 11:
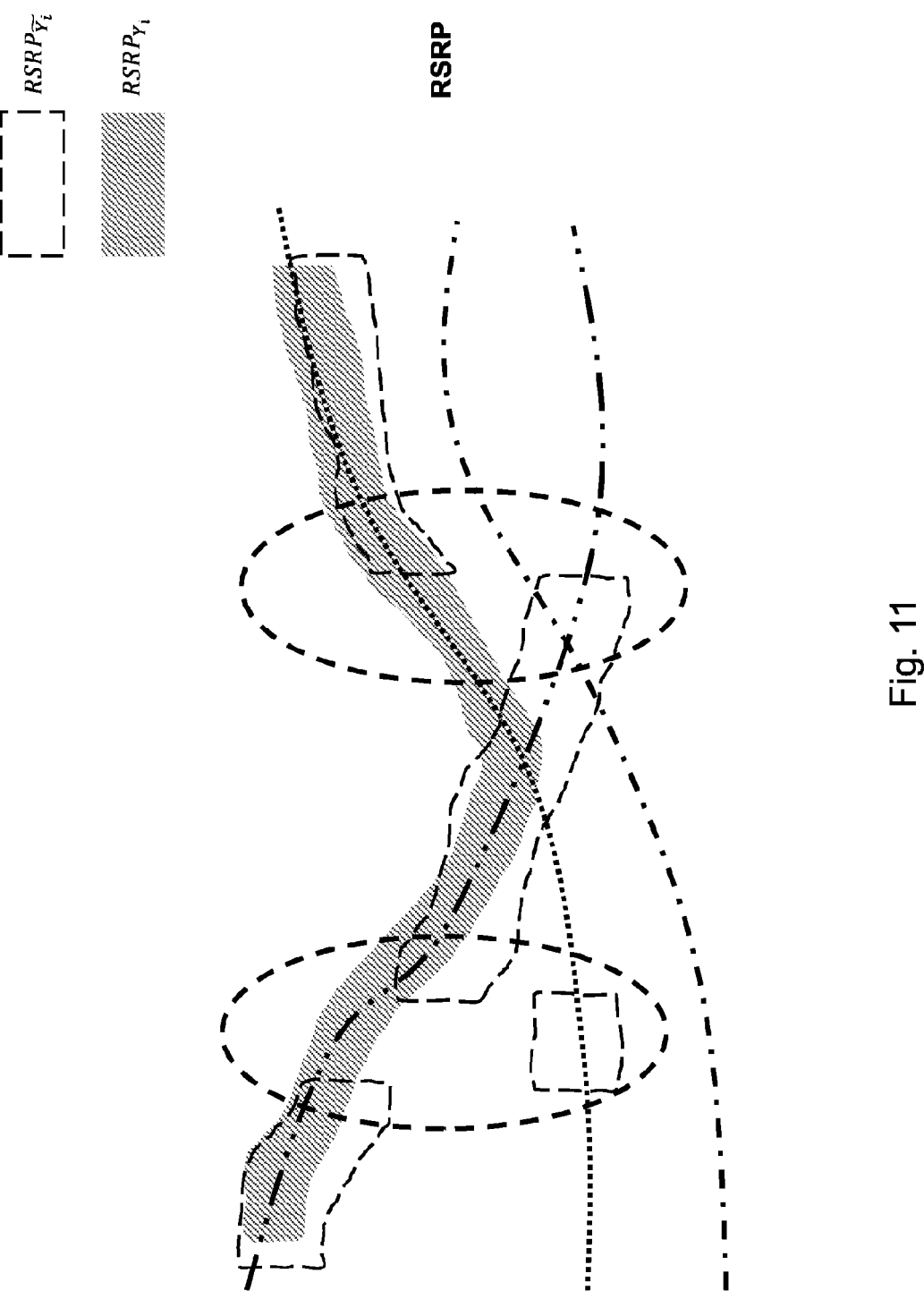
FIG. 11 is a schematic diagram illustrating results of the application of a predictive model and the evaluation thereof according to example embodiments.

FIG. 11 is a schematic diagram illustrating results of the application of a predictive model and the evaluation thereof according to example embodiments. In particular, FIG. 11 illustrates an example showing high loss regions according to an example.

FIG. 11 demonstrates how the high loss may look like. Again, a Cell ID that is selected as label is the cell with highest average RSRP over a time period T. As can be seen from FIG. 11, thus, the label at any time approximately corresponds to the RSRP line the value of which is highest at that moment. In the first circled area, the ML model clearly makes a misprediction, which results in high loss (since the cell with the second highest RSRP is selected) and triggers the event. The model corrects this soon after, but then does a late handover, which again leads to high loss (since the cell with the second highest RSRP and later the lowest is selected), such that the event is triggered. This demonstrates how the data collection is enabled from problematic regions, while in other areas when the handover is successful, the UE would have not feedbacked the measurements.

Figure 12:
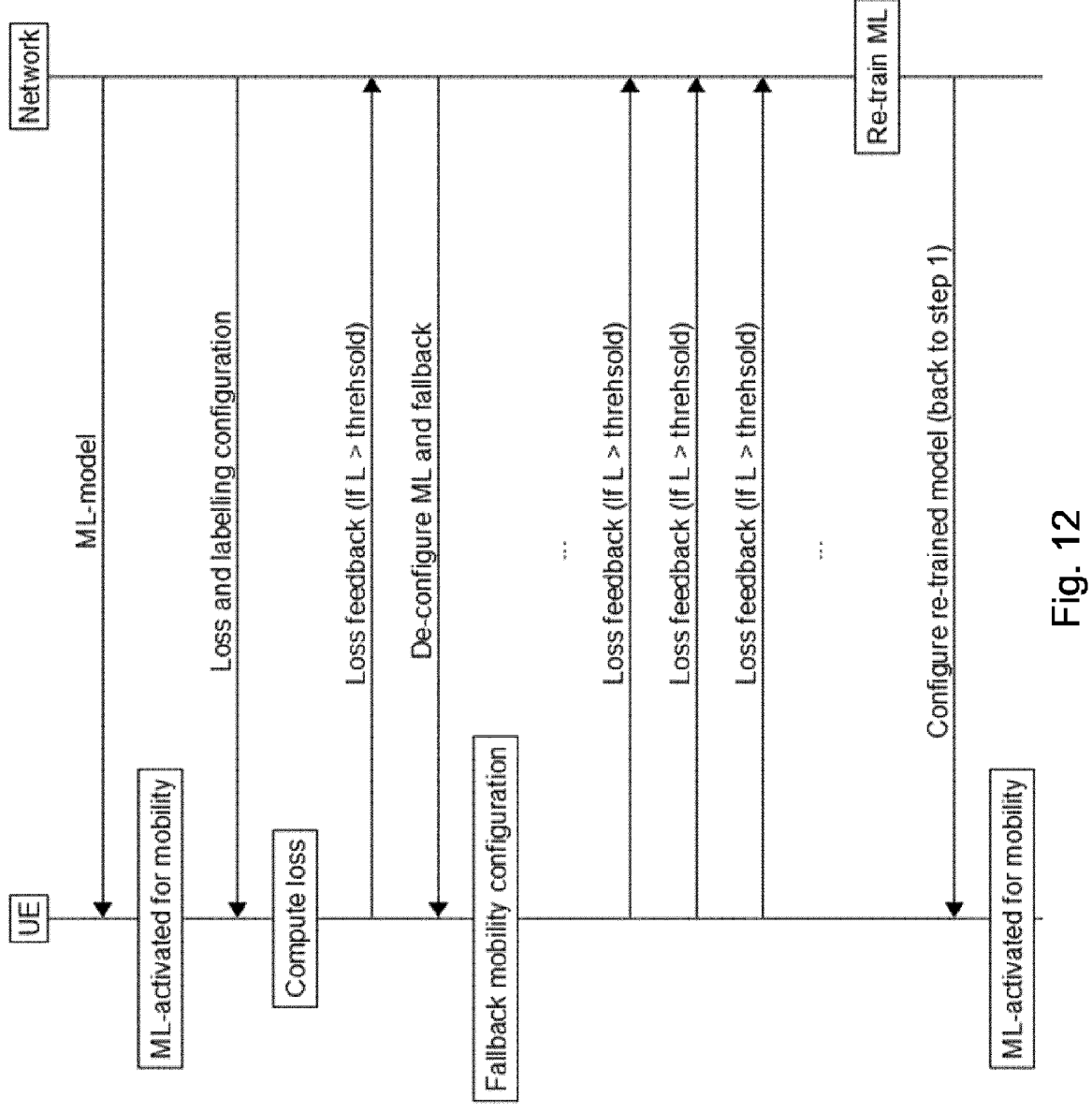
FIG. 12 shows a schematic diagram of signaling sequences according to example embodiments.

FIG. 12 shows a schematic diagram of signaling sequences according to example embodiments. In particular, FIG. 12 illustrates signaling in relation to online validation and re-training.

FIG. 12 demonstrates the signaling for the actions described in step 4a of the above-outlined implementation structure. When high loss samples are detected, the ML is de-configured and fallback handover is configured (e.g. typical measurement-event based). According to example embodiments, the UE continues to feedback measurement reports with high loss, and the network re-trains the model based on those. At some point, according to example embodiments, the UE is configured with the re-trained model, and the process starts at the beginning.

However, according to alternative embodiments, it is also possible that when the ML model is provided, the model is not activated, and the UE uses the typical measurement-event based handover. In this case, according to example embodiments, the network collects the measurements from high loss areas to re-train the model, and every now and then provides the updated model to the UE. Once the UE reports that the average loss is low, the network may decide to activate the model. This can happen with active or idle/ inactive users.

According to further example embodiments, the UE feedbacks only the average loss over a certain period for the network to determine validity of the model. This may then trigger activation or de-configuration of the ML model. This might be implemented as above but without feedbacking the measurements and re-training of the model.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 13:
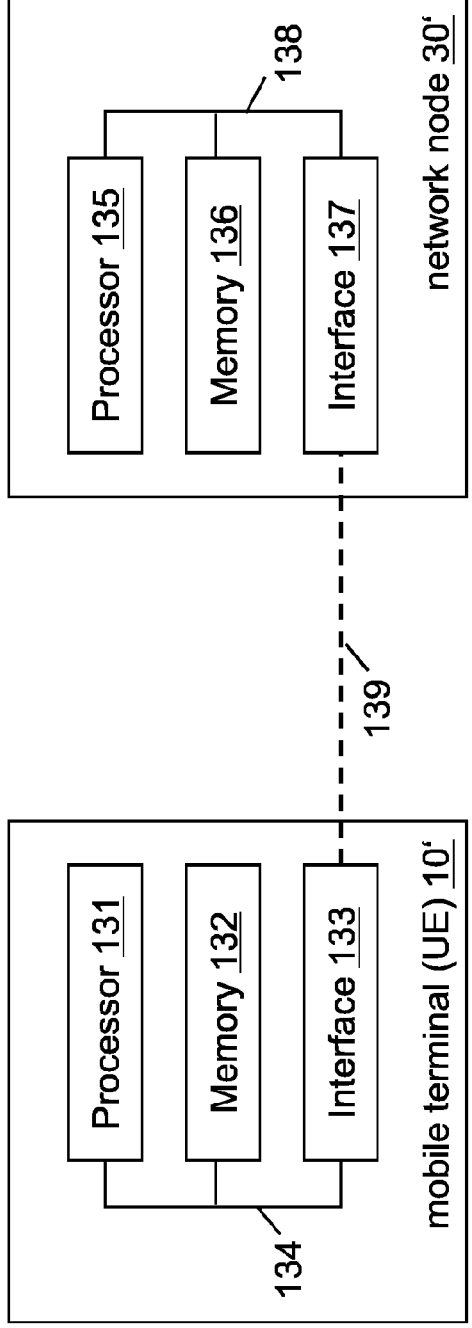
FIG. 13 is a block diagram alternatively illustrating apparatuses according to example embodiments.

In FIG. 13, an alternative illustration of apparatuses according to example embodiments is depicted. As indicated in FIG. 13, according to example embodiments, the apparatus (mobile terminal) 10' (corresponding to the mobile terminal 10) comprises a processor 131, a memory 132 and an interface 133, which are connected by a bus 134 or the like. Further, according to example embodiments, the apparatus (network node) 30' (corresponding to the network node 30) comprises a processor 135, a memory 136 and an interface 137, which are connected by a bus 138 or the like, and the apparatuses may be connected via link 139, respectively.

The processor 131/135 and/or the interface 133/137 may also include a modem or the like to facilitate communication over a (hardwire or wireless) link, respectively. The interface 133/137 may include a suitable transceiver coupled to one or more antennas or communication means for (hardwire or wireless) communications with the linked or connected device(s), respectively. The interface 133/137 is generally configured to communicate with at least one other apparatus, i.e. the interface thereof.

The memory 132/136 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the mobile terminal 10 comprises at least one processor 131, at least one memory 132 including computer program code, and at least one interface 133 configured for communication with at least another apparatus. The processor (i.e. the at least one processor 131, with the at least one memory 132 and the computer program code) is configured to perform receiving information on a predictive model related to a radio resource management function (thus the apparatus comprising corresponding means for receiving), to perform obtaining behavior information on an intended behavior of said predicted model (thus the apparatus comprising corresponding means for obtaining), to perform obtaining difference determination information on difference determination with respect to a predictive model prediction and said intended behavior, to perform measuring a network condition (thus the apparatus comprising corresponding means for measuring), to perform determining a prediction result based on said network condition and said information on said predictive model (thus the apparatus comprising corresponding means for determining), to perform determining a behavior result based on said network condition and said behavior information, and to perform evaluating validity of said predictive model based on said prediction result, said behavior result, and said difference determination information (thus the apparatus comprising corresponding means for evaluating).

According to example embodiments, an apparatus representing the network node 30 comprises at least one processor 135, at least one memory 136 including computer program code, and at least one interface 137 configured for communication with at least another apparatus. The processor (i.e. the at least one processor 135, with the at least one memory 136 and the computer program code) is configured to perform maintaining a predictive model related to a radio resource management function (thus the apparatus comprising corresponding means for maintaining), to perform transmitting, towards a mobile terminal, information on said predictive model (thus the apparatus comprising corresponding means for transmitting), and to perform transmitting, towards said mobile terminal, difference threshold information indicative of a difference threshold for evaluation of validity of said predictive model.

For further details regarding the operability/functionality of the individual apparatuses, reference is made to the above description in connection with any one of FIGS. 1 to 12, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for evaluation and control of predictive machine learning models in mobile networks. Such measures exemplarily comprise receiving information on a predictive model related to a radio resource management function, obtaining behavior information on an intended behavior of said predicted model, obtaining difference determination information on difference determination with respect to a predictive model prediction and said intended behavior, measuring a network condition, determining a prediction result based on said network condition and said information on said predictive model, determining a behavior result based on said network condition and said behavior information, and evaluating validity of said predictive model based on said prediction result, said behavior result, and said difference determination information.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
BFD bidirectional forwarding detection
CHO conditional handover
MDT minimization of drive tests
ML machine learning
MRO mobility robustness optimization
MSE mean square error
NR New Radio
RLF radio link failure
RLM radio link monitoring
RRM radio resource management
RSRP reference signal received power
UE user equipment

The invention claimed is:

1. A method of a mobile terminal, the method comprising:
receiving information on a predictive model related to a radio resource management function,
obtaining behavior information on an intended behavior of said predicted model,
obtaining difference determination information on difference determination with respect to a predictive model prediction and said intended behavior,
measuring a network condition,
determining a prediction result based on said network condition and said information on said predictive model,
determining a behavior result based on said network condition and said behavior information,
receiving difference threshold information indicative of a difference threshold,
evaluating validity of said predictive model based on said prediction result, said behavior result, and said difference determination information by determining a value indicative of a difference between said prediction result and said behavior result based on said difference determination information, and comparing said value indicative of said difference with said difference threshold,
deciding reduced validity of said predictive model, if said value indicative of said difference exceeds said difference threshold, and
forwarding said measured network condition, said prediction result, said behavior result and said value indicative of said difference towards a network node in response to said deciding said reduced validity of said predictive model.

2. The method according to claim 1, further comprising
storing said measured network condition, said prediction result, said behavior result, and said value indicative of said difference in response to said deciding said reduced validity, and
transmitting said stored measured network condition, prediction result, behavior result, and value indicative of said difference towards a network node in response to a predetermined event.

3. The method according to claim 2, further comprising
activating utilization of an alternative control processing with respect to said radio resource management function based on said deciding said reduced validity of said predictive model.

4. The method according to claim 3, further comprising de-activating utilization of said predictive model based on said deciding said reduced validity of said predictive model.

5. The method according to claim 4, further comprising receiving an instruction regarding control processing with respect to said radio resource management function.

6. The method according to claim 1, further comprising notifying capability for determination of a behavior according to said behavior information, and notifying capability for determination of a difference according to said difference determination information.

7. The method according to claim 1, further comprising notifying capability for evaluation of validity with respect to said radio resource management function.

8. The method according to claim 1, further comprising receiving said behavior information, and receiving said difference determination information.

9. The method according to claim 1, wherein said predictive model is a predictive mobile terminal handover model, and said network condition is a reference signal received power.

10. A method of a network node, the method comprising:
maintaining a predictive model related to a radio resource management function,
transmitting, towards a mobile terminal, information on said predictive model, and
transmitting, towards said mobile terminal, difference threshold information indicative of a difference threshold for evaluation of validity of said predictive model,
the method further comprising:
receiving a notification of capability of said mobile terminal for determination of a behavior according to said behavior information,
receiving a notification of capability of said mobile terminal for determination of a difference according to said difference determination information,
receiving, from said mobile terminal, a measured network condition, a prediction result determined based on said network condition and said information on said predictive model, a behavior result determined based on said network condition and said behavior information, and a value indicative of a difference between said prediction result and said behavior result determined based on said difference determination information,
transmitting an instruction to activate utilization of an alternative control processing with respect to said radio resource management function based on said measured network condition, prediction result, behavior result, and value indicative of said difference,
transmitting an instruction to de-activate utilization of said predictive model based on said measured network condition, prediction result, behavior result, and value indicative of said difference.

11. The method according to claim 10, further comprising receiving a notification of capability of said mobile terminal for evaluation of validity with respect to said radio resource management function.

12. The method according to claim 10, further comprising transmitting, towards said mobile terminal, behavior information on an intended behavior of said predicted model, and transmitting, towards said mobile terminal, difference determination information on difference determination with respect to a predictive model prediction and said intended behavior.

13. The method according to claim 10, further comprising re-training said predictive model based on said measured network condition, prediction result, behavior result, and value indicative of said difference.

14. The method according to claim 13, further comprising transmitting, towards said mobile terminal, information on said re-trained predictive model.

15. The method according to claim 10, further comprising transmitting, towards said mobile terminal, information on actions to be triggered upon decided reduced validity of said predictive model.

16. An apparatus of a mobile terminal, the apparatus comprising:
at least one processor,
at least one memory including computer program code, and
at least one interface configured for communication with at least another apparatus,
the at least one processor, with the at least one memory and the computer program code, being configured to cause the apparatus to perform:
receiving information on a predictive model related to a radio resource management function,
obtaining behavior information on an intended behavior of said predicted model,
obtaining difference determination information on difference determination with respect to a predictive model prediction and said intended behavior,
measuring a network condition,
determining a prediction result based on said network condition and said information on said predictive model,
determining a behavior result based on said network condition and said behavior information,
receiving difference threshold information indicative of a difference threshold,
evaluating validity of said predictive model based on said prediction result, said behavior result, and said difference determination information, by determining a value indicative of a difference between said prediction result and said behavior result based on said difference determination information, and comparing said value indicative of said difference with said difference threshold,
deciding reduced validity of said predictive model, if said value indicative of said difference exceeds said difference threshold, and
forwarding said measured network condition, said prediction result, said behavior result and said value indicative of said difference towards a network node in response to said deciding said reduced validity of said predictive model.

17. The apparatus according to claim 16, wherein the at least one processor, with the at least one memory and the computer program code, being configured to cause the apparatus to perform:
storing said measured network condition, said prediction result, said behavior result, and said value indicative of said difference in response to said deciding said reduced validity, and
transmitting said stored measured network condition, prediction result, behavior result, and value indicative of said difference towards a network node in response to a predetermined event.

18. The apparatus according to claim 16, wherein the at least one processor, with the at least one memory and the computer program code, being configured to cause the apparatus to perform:

activating utilization of an alternative control processing with respect to said radio resource management function based on said deciding said reduced validity of said predictive model.

19. The apparatus according to claim 16, wherein the at least one processor, with the at least one memory and the computer program code, being configured to cause the apparatus to perform:
de-activating utilization of said predictive model based on said deciding said reduced validity of said predictive model.

20. The apparatus according to claim 16, wherein the at least one processor, with the at least one memory and the computer program code, being configured to cause the apparatus to perform:
receiving an instruction regarding control processing with respect to said radio resource management function.

21. The apparatus according to claim 16, wherein the at least one processor, with the at least one memory and the computer program code, being configured to cause the apparatus to perform:
notifying capability for determination of a behavior according to said behavior information, and
notifying capability for determination of a difference according to said difference determination information.

22. The apparatus according to claim 16, wherein the at least one processor, with the at least one memory and the computer program code, being configured to cause the apparatus to perform:
notifying capability for evaluation of validity with respect to said radio resource management function.

23. The apparatus according to claim 16, wherein the at least one processor, with the at least one memory and the computer program code, being configured to cause the apparatus to perform:
receiving said behavior information, and
receiving said difference determination information.

24. An apparatus of a network node, the apparatus comprising:
at least one processor,
at least one memory including computer program code, and
at least one interface configured for communication with at least another apparatus,
the at least one processor, with the at least one memory and the computer program code, being configured to cause the apparatus to perform:
maintaining a predictive model related to a radio resource management function,
transmitting, towards a mobile terminal, information on said predictive model, and
transmitting, towards said mobile terminal, difference threshold information indicative of a difference threshold for evaluation of validity of said predictive model,
the at least one processor, with the at least one memory and the computer program code, being configured to cause the apparatus to perform:

receiving a notification of capability of said mobile terminal for determination of a behavior according to said behavior information,
receiving a notification of capability of said mobile terminal for determination of a difference according to said difference determination information,
receiving a notification of capability of said mobile terminal for evaluation of validity with respect to said radio resource management function,
receiving, from said mobile terminal, a measured network condition, a prediction result determined based on said network condition and said information on said predictive model, a behavior result determined based on said network condition and said behavior information, and a value indicative of a difference between said prediction result and said behavior result determined based on said difference determination information,
transmitting an instruction to activate utilization of an alternative control processing with respect to said radio resource management function based on said measured network condition, prediction result, behavior result, and value indicative of said difference,
transmitting an instruction to de-activate utilization of said predictive model based on said measured network condition, prediction result, behavior result and value indicative of said difference.

25. The apparatus according to claim 24, wherein the at least one processor, with the at least one memory and the computer program code, being configured to cause the apparatus to perform:
transmitting, towards said mobile terminal, behavior information on an intended behavior of said predicted model, and
transmitting, towards said mobile terminal, difference determination information on difference determination with respect to a predictive model prediction and said intended behavior.

26. The apparatus according to claim 24, wherein the at least one processor, with the at least one memory and the computer program code, being configured to cause the apparatus to perform:
re-training said predictive model based on said measured network condition, prediction result, behavior result, and value indicative of said difference.

27. The apparatus according to claim 26, wherein the at least one processor, with the at least one memory and the computer program code, being configured to cause the apparatus to perform:
transmitting, towards said mobile terminal, information on said re-trained predictive model.

28. The apparatus according to claim 24, wherein the at least one processor, with the at least one memory and the computer program code, being configured to cause the apparatus to perform:
transmitting, towards said mobile terminal, information on actions to be triggered upon decided reduced validity of said predictive model.

* * * * *